(12) United States Patent
Hineno

(10) Patent No.: US 6,339,577 B1
(45) Date of Patent: Jan. 15, 2002

(54) OPTICAL DISK SYSTEM, OPTICAL HEAD DEVICE, AND BEAM RESHAPING DEVICE

(75) Inventor: Satoshi Hineno, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/352,367

(22) Filed: Jul. 13, 1999

(30) Foreign Application Priority Data

Jul. 14, 1998 (JP) .......................................... P10-198206

(51) Int. Cl.$^7$ ................................................. G11B 7/00
(52) U.S. Cl. ........................... 369/112.24; 369/112.04; 359/565
(58) Field of Search ................. 369/112.23, 112.24, 369/112.25, 112.26, 112.05–112.08, 112.11, 112.12, 112.13, 44.23, 112.15, 112.1; 359/565, 569, 571, 574, 710

(56) References Cited

U.S. PATENT DOCUMENTS

| | | | |
|---|---|---|---|
| 5,081,639 A | 1/1992 | Snyder et al. | ............... 372/101 |
| 5,181,224 A | 1/1993 | Snyder | ........................ 372/101 |
| 5,237,451 A * | 8/1993 | Saxe | ........................... 359/565 |

* cited by examiner

*Primary Examiner*—Thang V. Tran
(74) *Attorney, Agent, or Firm*—Rader, Fishman & Grauer PLLC; Ronald P. Kananen, Esq.

(57) ABSTRACT

A beam reshaping device includes first and second beam converting units having beam converging powers different in two orthogonal directions. The first and second beam converting units are arranged such that conjugate points correspond to each other in the two orthogonal directions, thereby reshaping the sectional form of a laser beam emitted from a laser light source, while effectively preventing occurrence of astigmatism. The beam reshaping device may be applied to an optical head device and which in turn may be used in an optical disk system.

30 Claims, 4 Drawing Sheets

OPTICAL DISK SYSTEM, OPTICAL HEAD DEVICE, AND BEAM RESHAPING DEVICE

BACKGROUND OF THE INVENTION

The present invention relates to a beam reshaping device, and an optical head device and an optical disk system using the beam reshaping device. The present invention is typically applicable to an optical disk system and an optical head device for recording or reproducing information on or from a phase change type optical disk. In particular, the present invention relates to a beam reshaping device including first and second beam converting means having beam converging powers different in two orthogonal directions wherein the first and second beam converting means are arranged such that conjugate points correspond to each other in the two orthogonal directions, thereby reshaping the sectional form of a laser beam while effectively preventing occurrence of astigmatism of the laser beam.

A known optical disk system is configured to record or reproduce information on or from an optical disk by converging a laser beam emitted from a laser diode on the optical disk and receiving a return beam reflected from the optical disk.

In such an optical disk system, a laser beam emitted from a laser diode is converted into a collimated beam by a collimator lens and is converged on an optical disk, and an anamorphic prism is interposed in the optical path as needed to reshape an elliptic form in cross-section of the laser beam into a circular form. The technique for reshaping the sectional form of a laser beam has been disclosed in, for example, U.S. Pat. Nos. 5,181,224 and U.S. Pat. No. 5,081,639.

On the other hand, to enhance the recording density, the optical disk system may be required to correct the spherical aberration of a laser beam caused by a variation in thickness of a light transmission layer of an optical disk or the accuracy of an optical part.

In the case of reshaping the sectional form of a laser beam emitted from a light source by using the anamorphic prism, however, there arises a problem associated with occurrence of astigmatism of the laser beam. If such astigmatism occurs, it becomes difficult for the optical disk system to simply correct the spherical aberration of the laser beam. Further, in the case of using a semiconductor laser as the light source, since a laser beam emitted from the semiconductor laser contains astigmatism, it is required to correct such astigmatism.

SUMMARY OF THE INVENTION

An object of the present invention is to provide a beam reshaping device capable of reshaping the sectional form of a laser beam while effectively preventing occurrence of astigmatism of the laser beam, and an optical disk system and an optical head device using the beam reshaping device.

To achieve the above object, according to the present invention, there is provided an optical disk system for recording or reproducing information on or from an optical disk by irradiating the optical disk with a laser beam, the optical disk system including: a laser light source for emitting a laser beam; a beam reshaping means for reshaping the sectional form of the laser beam emitted from the laser light source; a converging means for converging the laser beam reshaped by the beam reshaping means on the optical disk. The beam reshaping means includes: a first beam converting means having beam converging powers different in a direction along a first virtual line perpendicular to an optical axis and in a direction along a second virtual line perpendicular to the optical axis and the first virtual line, the means allowing the laser beam having been made incident on the means to pass therethrough; and a second beam converting means having beam converging powers different in the direction along the first virtual line and in the direction along the second virtual line, the means allowing the laser beam having passed through the first beam converting means to pass therethrough; wherein the first beam converting means and the second beam converting means are arranged such that conjugate points correspond to each other in the direction along the first virtual line and in the direction along the second virtual line.

In the above first and second beam converting means having beam converting powers different in two direction, conjugate points are allowed to correspond to each other in the two directions by suitably selecting the powers, the distance between the first and second beam converting means, and the like. As a result, it is possible to converge the laser beam emerged from one image formation point on the corresponding objective point without occurrence of astigmatism of the laser beam, and to variously reshape the sectional form of the laser beam by suitably setting the extension degrees of the laser beam in the two directions by changing the powers and the like.

According to the present invention, since the first and second beam converting means having beam converging powers different in two orthogonal directions are arranged such that conjugate points correspond to each other in the two orthogonal directions, it is possible to reshape the sectional form of a laser beam while effectively preventing occurrence of astigmatism upon beam reshaping, and if the laser beam emitted from a light source contains astigmatism, it is possible to suitably correct the astigmatism contained in the laser beam.

DETAILED DESCRIPTION OF THE PREFERRED EMBODIMENTS

Hereinafter, preferred embodiments of the present invention will be described with reference to the accompanying drawings.

First Embodiment

Figure 1:
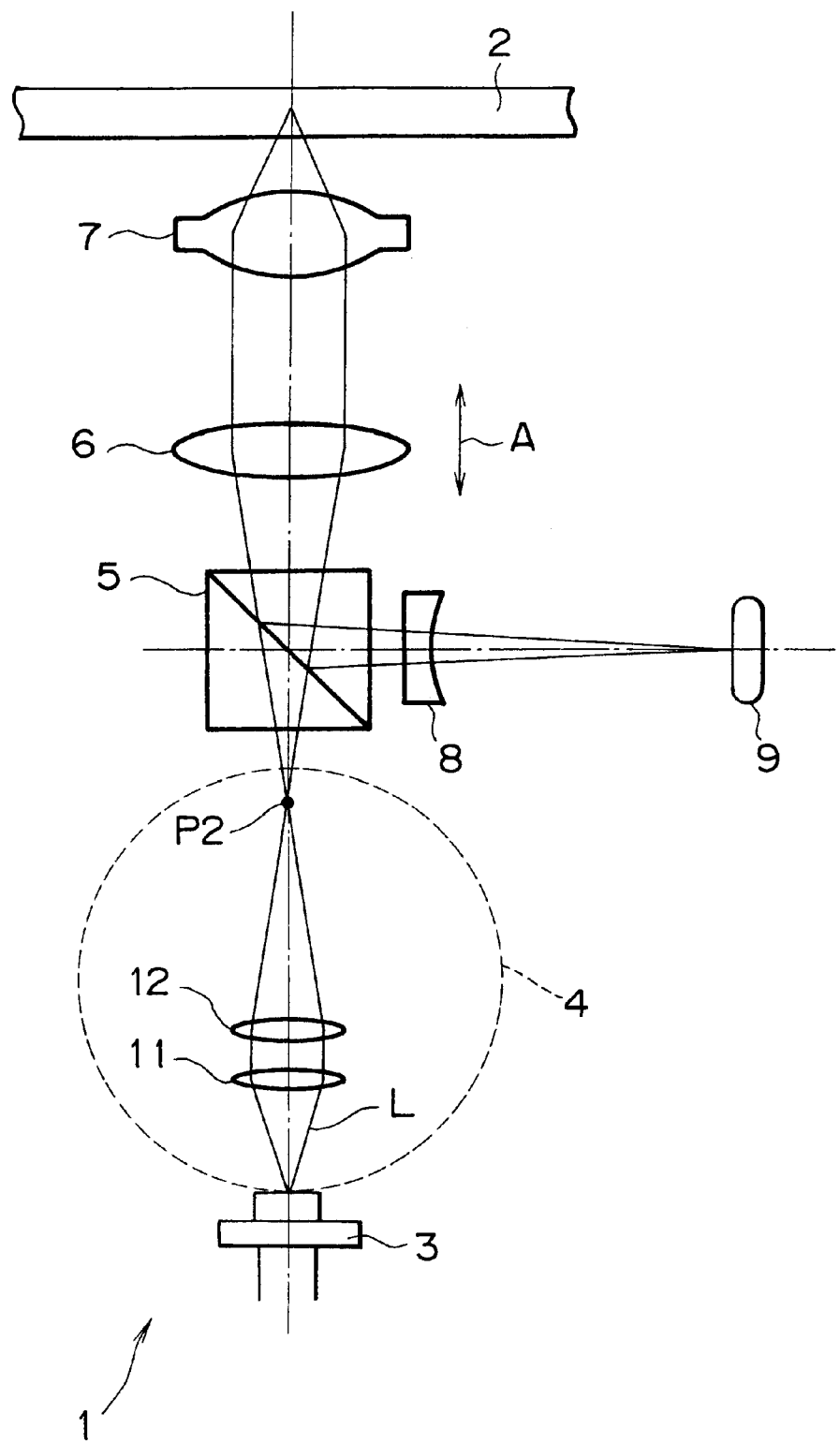
FIG. 1 is a schematic diagram showing an optical head device applied to an optical disk system according to a first embodiment of the present invention.

FIG. 1 is a schematic diagram showing a configuration of an optical head device applied to an optical disk system according to a first embodiment of the present invention. In this optical disk system, a phase change type optical disk 2 is irradiated with a laser beam by an optical head device 1, to record or reproduce data on or from the optical disk 2.

A configuration of the optical head device 1 will be described below. A laser diode 3 is driven by a specific driver circuit to emit a laser beam L as a divergent beam. An anamorphic optical system 4 reshapes the sectional form of the laser beam L and allows the laser beam L thus reshaped to pass therethrough. A polarization beam splitter 5 allows the laser beam L emerged from the anamorphic optical system 4 to pass therethrough toward a collimator lens 6. The collimator lens 6 converts the laser beam L into an approximately collimated beam and allows the laser beam L thus collimated to pass therethrough. An objective lens 7, which is configured as a condenser lens having a high numerical aperture, converges the laser beam L emerged from the collimator lens 6 on an information recording plane of the optical disk 2. The optical disk system having such a configuration is adapted to record desired data on the information recording plane of the optical disk 2 while intermittently raising the quantity of the laser beam L.

The collimator lens 6 of the optical head device 1 is movable in the direction along the optical axis of the optical head device 1 as shown by an arrow A, to converge a laser beam while correcting the spherical aberration of the laser beam caused by a variation in thickness of a light transmission layer of the optical disk 2, the accuracy of an optical part, and the like.

In the optical head device 1, part of the laser beam L having been converged on the optical disk 2 is reflected therefrom, to create a return beam, and the return beam is received by the objective lens 7 to be converted into an approximately collimated beam. The return beam thus collimated is led to the collimator lens 6 to be converted into a converged beam, and then the return beam thus converged is reflected from the polarization beam splitter 5.

A multi-lens 8 gives an astigmatism to the return beam reflected from the polarization beam splitter 5. A photodetector 9, which receives the return beam emerged from the multi-lens 8, creates a reproducing signal, a focus error signal and the like, and outputs these signals. The optical disk system processes the signals thus outputted from the photodetector 9 to carry out tracking control, focus control and the like, and reproduces the data recorded on the optical disk 2.

Figure 2:
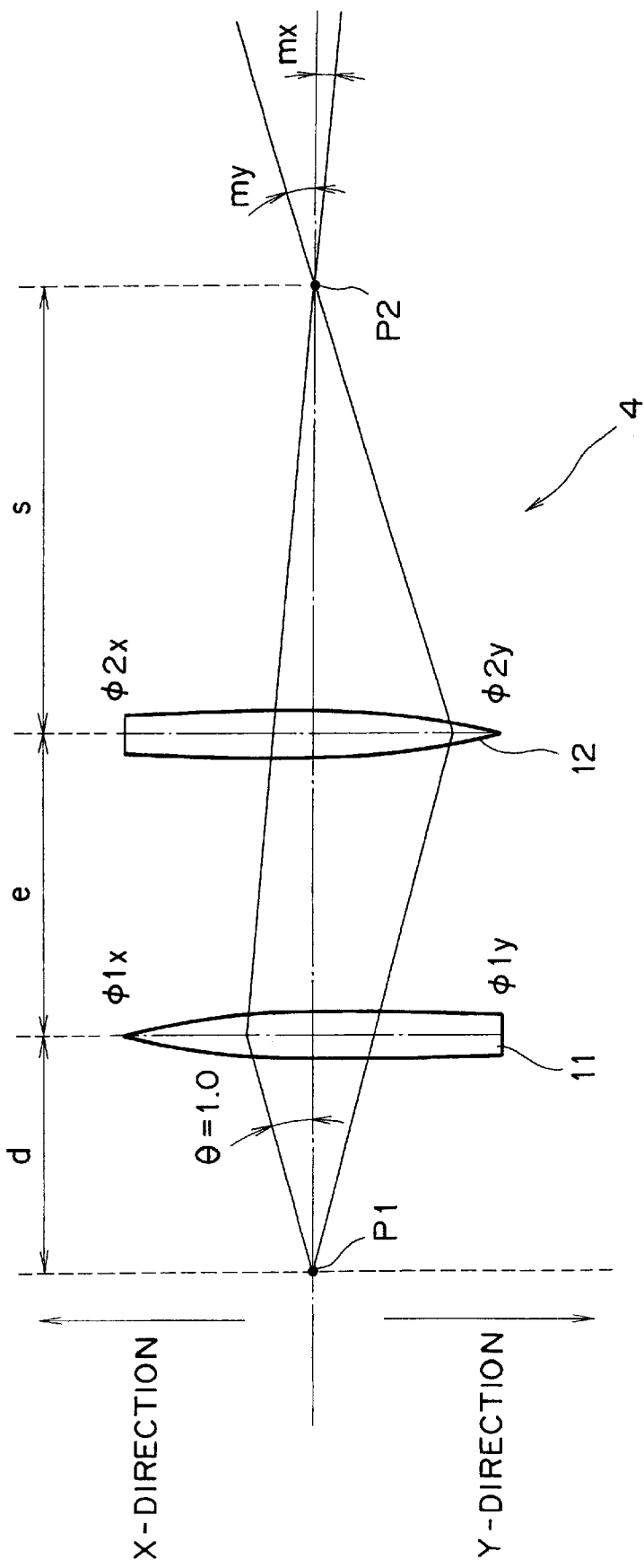
FIG. 2 is a schematic diagram showing an anamorphic optical system of the optical head device shown in FIG. 1.

FIG. 2 is a sectional diagram of the anamorphic optical system 4 taken on a plane which contains the optical axis and two axes perpendicular to the optical axis. When the optical axis is taken as the z-axis, the two axes perpendicular to the optical axis become the x-axis and y-axis. The anamorphic optical system 4 includes first and second toroidal lenses 11 and 12 arranged at specific positions.

The first and second toroidal lenses constitute first and second beam converting means each of which has beam converging powers different in two orthogonal directions, that is, in the x-direction and the y-direction in the example shown in FIG. 2. Specifically, in each of the toroidal lenses 11 and 12, the powers for converging an incident beam in the x-direction and the y-direction, which are perpendicular to the optical axis, are different from each other. The toroidal lenses 11 and 12 are arranged in this order from the laser diode 3 side such that conjugate points in these two directions correspond to each other.

The toroidal lenses 11 and 12 are also arranged such that in the x-direction and the y-direction, a laser beam emitted from the laser diode 3 as the light source is converged at one point P2 on the incident plane side of the polarization beam splitter 5 in a state in which the astigmatism is corrected and the sectional form of the laser beam is reshaped into a circular form.

Here, it is assumed that the light source is taken as a point P1; the powers of the first toroidal lens 11 in the x-direction and the y-direction are taken as $\Phi 1x$ and $\Phi 1y$, respectively; and the powers of the second toroidal lens 12 in the x-direction and the y-direction are taken as $\Phi 2x$ and $\Phi 2y$, respectively. Also, it is assumed that a laser beam emitted from the light source P1 is a divergent beam having divergent angles different in the x-direction and the y-direction, and the sectional form of the laser beam on the light source P1 side is spread in the x-direction more than that in the y-direction direction by a factor of m (m=α). Further, it is assumed that the distance between the point P1 and the first toroidal lens 11 is taken as "d"; the distance between the first and second toroidal lenses 11 and 12 is taken as "e"; and the distance between the second toroidal lens 12 to the focal point P2 is taken as "s". On the above assumption, the powers of the first and second toroidal lenses 11 and 12 are expressed by the following equation:

$$\Phi x = \Phi 1x + \Phi 2x - e\Phi 1x \times \Phi 2x$$
$$\Phi y = \Phi 1y + \Phi 2y - e\Phi 1y \times \Phi 2y \qquad (1)$$

Here, the requirement for a divergent beam emitted from the light source P1 to be focused at the point P2 in the system having the powers different in the x-direction and the y-direction is given by the following equation:

$$-d(\Phi 1x + \Phi 2x - e\Phi 1x \times \Phi 2x) + 1 - e\Phi 2x = mx$$
$$-d(\Phi 1y + \Phi 2y - e\Phi 1y \times \Phi 2y) + 1 - e\Phi 2y = my$$
$$\alpha = mx/my$$
$$s = [-d(1 - e\Phi_{1x}) - e]/mx \qquad (2)$$
$$= [-d(1 - e\Phi_{1y}) - e]/my$$

In the above equation, mx and my designate the extension of the laser beam passing through the focal point P2 with respect to the extension of the laser beam from the light source P1 in the x-direction and the y-direction, respectively. According to this embodiment, mx and my are set, on the basis of the equation (2), to correct the sectional form of the laser beam emitted from the laser diode 3 into a circular form.

By solving the equation (2), nine variables, the distances "d", "e" and "s", the powers $\Phi 1x$, $\Phi 2x$, $\Phi 1y$, and $\Phi 2y$, and the angles mx and my can be specified. This means that the anamorphic optical system has five degrees of freedom, and can optimize the aberration of a laser beam within the range of the five degrees of freedom.

To be more specific, the anamorphic optical system 4' designed by determining respective variables to satisfy the equations (1) and (2)' allows a laser beam emitted from the light source P1 to create an intermediate spot at the focal point P2 without occurrence of astigmatism and also in a state in which the astigmatism of the laser beam emitted from the light source P1 is corrected. At this time, an anamorphic ratio is given by α=mx/my.

Hereinafter, there will be described the system having an anamorphic ratio of 2 for reshaping the sectional form of a laser beam in which a ratio of the major axis to minor axis is 2. For simplification, it is assumed that the distance d=5.0 (mm), mx=−0.8, my =−0.4 and the power $\Phi 1x = \Phi 2y = 0$ (that is, in the case of a cylindrical lens).

In this case, by substituting the above values in the equation (2), other variables are all definitely determined as follows: the power $\Phi 1 = 0.28$, the power $\Phi 2x = 0.2314$, the distance "e"=2.778 (mm), and the distance "s"=9.7222 (mm).

In this way, according to this embodiment, the anamorphic optical system 4 can reshape the elliptic form in cross-section of the laser beam L into a circular form by setting the above variables.

In the optical head device 1 of the optical disk system having the above configuration, a laser beam L emitted from the laser diode 3 (see FIG. 1) passes through the anamorphic optical system 4 and the polarization beam splitter 5, being converted into a collimated beam by the collimator lens 6, and is converged on an information recording plane of the optical disk 2 through the objective lens 7. A return beam reflected from the optical disk 2 is led to the collimator lens 6 through the objective lens 7, to be converted into a converged beam, and is reflected from the polarization beam splitter 5 to be thus lead to the photodetector 9.

The laser beam emitted from the laser diode 3, which will be led to the optical disk 2, contains astigmatism and has an elliptic form in cross-section. At the first toroidal lens 11 of the anamorphic optical system 4, the laser beam is converged by the converging powers different in the x-direction and the y-direction, and at the subsequent second toroidal lens 12, the laser beam is similarly converged by the converging powers different in the x-direction and the y-direction. In this way, the laser beam is once focused at the focal point P2, and is then made incident on the polarization beam splitter 5.

In this case, the anamorphic optical system 4 sets mx and my, which determine the extension of the laser beam on the backward side from the focal point P2 with respect to the extension of the laser beam on the forward side from the light source P1, in order that the sectional form of the laser beam L is reshaped into a circular form on the backward side from the focal point P2 and that the laser beam L is focused at the point P2 in the x-direction and the y-direction, and sets the distances "d", "e" and "s", and the powers $\Phi 1x$, $\Phi 1y$, $\Phi 2x$, and $\Phi 2y$ to satisfy the relationship expressed by the equation (2), thereby reshaping the sectional form of the laser beam L into a circular form while effectively preventing occurrence of astigmatism.

As a result, it is possible to correct the spherical aberration of the laser beam caused by a variation in thickness of a light transmission layer of the optical disk 2 and the accuracy of an optical part by displacing the collimator lens 6 along the optical axis.

With this configuration, since the first and second toroidal lenses 11 and 12 having converging powers different in two orthogonal directions are arranged such that conjugate points correspond to each other in the two orthogonal directions, it is possible to reshape the sectional form of a laser beam while effectively preventing occurrence of astigmatism with a simple structure, and if the laser beam emitted from the laser diode 3 contains astigmatism, it is possible to suitably correct the astigmatism contained in the laser beam.

In this case, by focusing the laser beam at the focal point P2 once, it is possible to establish an optical system for reshaping, at a high degree of freedom, the sectional form of a laser beam between an objective point and an image formation point.

Further, since mx and my, which designate the extension of the laser beam on the backward side from the focal point P2 with respect to the extension of the laser beam on the forward side from the light source P1, can be each set at a value less than 1, it is possible to make small the numerical aperture N of the collimator lens 6 and also reduce the sizes of other optical parts, and hence to miniaturize the entire configuration of the optical head device.

Second Embodiment

Figure 3:
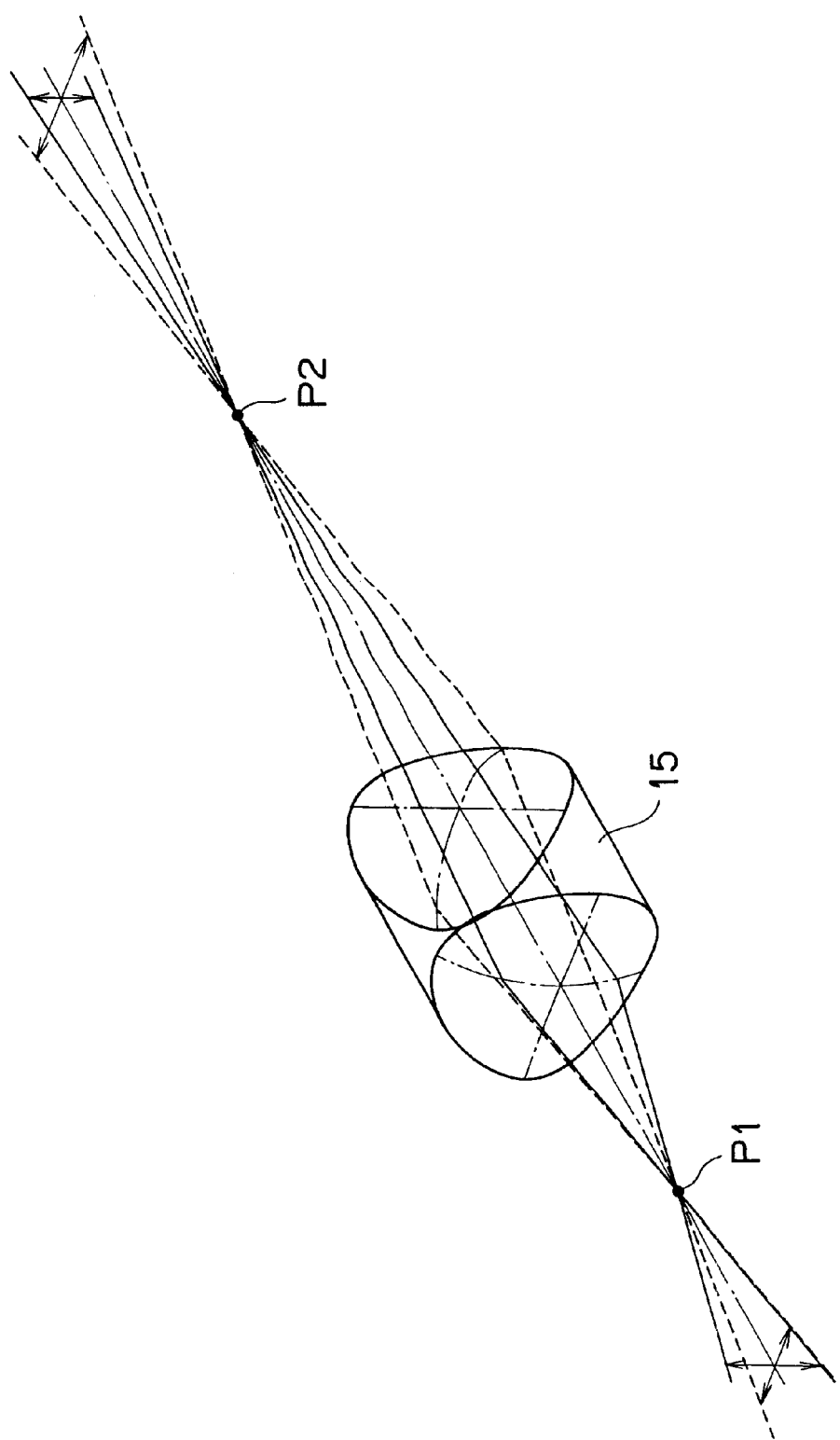
FIG. 3 is a schematic diagram showing an anamorphic optical system applied to an optical head device of an optical disk system according to a second embodiment of the present invention.

FIG. 3 is a perspective diagram showing an anamorphic optical system applied to an optical head device of an optical disk system according to a second embodiment of the present invention. In this optical system, a light incoming plane and a light outgoing plane of a single lens 15 are taken as toroidal planes, which constitute first and second converging optical means each having converging powers different in two directions, thereby reshaping the sectional form of a laser beam.

With the configuration shown in FIG. 3, since the light incoming plane and the light outgoing plane of the single lens 15 are taken as the toroidal planes which constitute first and second converging optical means each having converging powers different in two directions, it is possible to more simply obtain the same effect as that obtained in the first embodiment.

Third Embodiment

Figure 4:
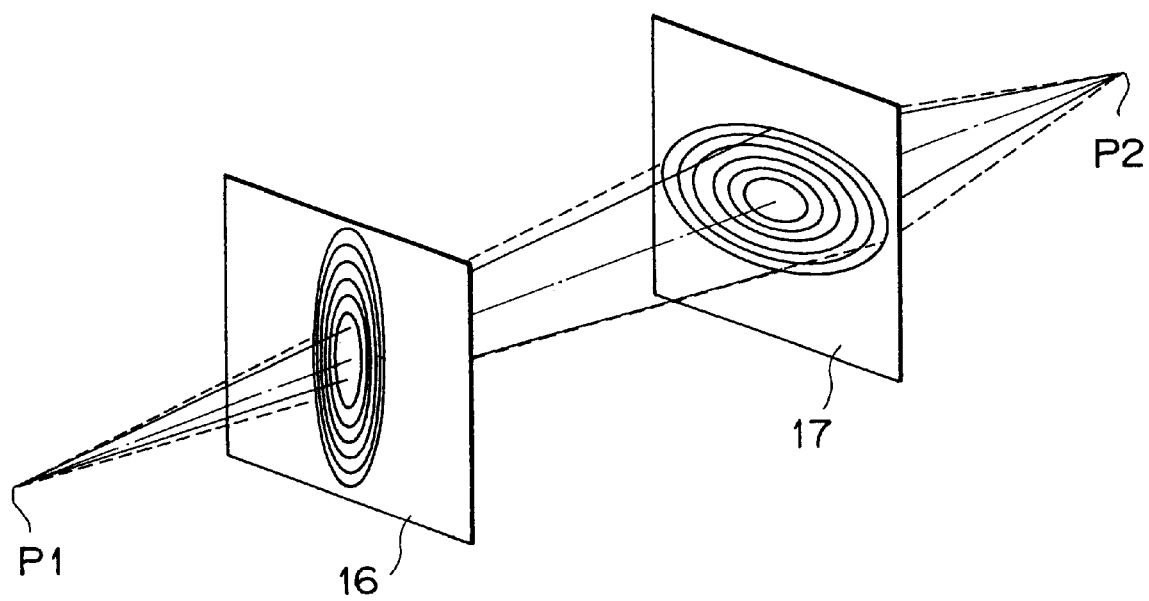
FIG. 4 is a schematic diagram showing an anamorphic optical system applied to an optical head device of an optical disk system according to a third embodiment of the present invention.

FIG. 4 is a perspective diagram showing an anamorphic optical system applied to an optical head device of an optical disk system according to a third embodiment of the present invention. In this optical system, first and second hologram elements 16 and 17 constitute first and second converging optical means each having converging powers different in two directions, to thereby reshape the sectional form of a laser beam.

With the configuration shown in FIG. 4, in which the first and second converging optical means are configured as the hologram elements, it is possible to obtain the same effect as that obtained in the first embodiment.

Other Embodiments

In the above-described embodiments, the anamorphic optical system functioning as the beam reshaping device is composed of the two converging optical means; however, the present invention is not limited thereto, and the beam reshaping device may be composed of three or more converging optical means, as needed.

Further, in the above-described embodiments, the present invention is applied to a phase change type optical disk system; however, the present invention is not limited thereto but may be widely applied to various optical disk systems such as a magneto-optic disk and to optical equipment requiring the beam reshaping device.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

What is claimed is:

1. An optical disk system for recording or reproducing information on or from an optical disk by irradiating said optical disk with a laser beam, said optical disk system comprising:

a laser light source for emitting a laser beam;

a beam reshaping means for reshaping a sectional form of the laser beam emitted from said laser light source;

a converging means for converging the laser beam reshaped by said beam reshaping means onto said optical disk;

wherein said beam reshaping means comprises:

a first beam converting means having beam converging powers different in a direction along a first virtual line perpendicular to an optical axis and in a direction along a second virtual line perpendicular to both the optical axis and the first virtual line, said first beam converting means allowing the laser beam, having been made incident on said means, to pass therethrough; and a second beam converting means having beam converging powers different in the direction along the first virtual line and in the direction along the second virtual line, said second beam converting means allowing the laser beam, having passed through said first beam converting means, to pass therethrough;

wherein said first beam converting means and said second beam converting means are arranged such that conjugate points correspond to each other in the direction along the first virtual line and in the direction along the second virtual line.

2. An optical disk system according to claim 1, wherein at least one of said first beam converting means and said second beam converting means comprises a toroidal lens.

3. An optical disk system according to claim 1, wherein at least one of said first beam converting means and said second beam converting means comprises a hologram element.

4. An optical disk system according to claim 1, wherein said first beam converting means and said second beam converting means comprise a light incoming plane and a light outgoing plane of a single lens respectively, which planes are formed into toroidal planes.

5. An optical disk system according to claim 1, wherein said converging means is provided to converge, on said optical disk, the laser beam which has been reshaped by said beam reshaping means, having passed through a focal point, and has been made divergent.

6. An optical disk system according to claim 5, wherein said converging means comprises:

a collimator lens for converting the laser beam, having passed through the focal point and having been made divergent, into an approximately collimated beam; and a condenser lens for converging the collimated laser beam.

7. An optical disk system according to claim 6, wherein said converging means further comprises a moving means for moving said collimator lens in a direction of the optical axis.

8. An optical head device for recording or reproducing information on or from an optical information medium by converging a laser beam emitted from a semiconductor laser light source on said medium, said optical head device comprising:

a beam reshaping means for reshaping a sectional form of the laser beam emitted from said semiconductor laser light source;

wherein said beam reshaping means comprises:

a first beam converting means having beam converging powers different in a direction along a first virtual line perpendicular to an optical axis and in a direction along a second virtual line perpendicular to both the optical axis and the first virtual line, said first beam converting means allowing the laser beam, having been made incident on said means, to pass therethrough; and a second beam converting means having beam converging powers different in the direction along the first virtual line and in the direction along the second virtual line, said second beam converting means allowing the laser beam, having passed through said first beam converting means, to pass therethrough;

wherein said first beam converting means and said second beam converting means are arranged such that conjugate points correspond to each other in said direction along said first virtual line and in said direction along said second virtual line.

9. An optical head device according to claim 8, wherein at least one of said first beam converting means and said second beam converting means comprises a toroidal lens.

10. An optical head device according to claim 8, wherein at least one of said first beam converting means and said second beam converting means comprises a hologram element.

11. An optical head device according to claim 8, wherein said first beam converting means and said second beam converting means comprise a light incoming plane and a light outgoing plane of a single lens, respectively, which planes are formed into toroidal planes.

12. An optical head device according to claim 8, further comprising a converging means for converging, on said optical information medium, the laser beam which has been reshaped by said beam reshaping means, having passed through a focal point, and has been made divergent.

13. An optical head device according to claim 12, wherein said converging means comprises;

a collimator lens for converting the laser beam, having passed through the focal point and having been made divergent, into an approximately collimated beam; and a condenser lens for converging the collimated laser beam.

14. An optical head device according to claim 13, wherein said converging means further comprises a moving means for moving said collimator lens in a direction of the optical axis.

15. A beam reshaping device comprising:

a first beam converting means having beam converging powers different in a direction along a first virtual line perpendicular to an optical axis and in a direction along a second virtual line perpendicular to the optical axis and the first virtual line, said first beam converting means allowing the laser beam having been made incident on said first beam converting means, to pass therethrough; and a second beam converting means having beam converging powers different in the direction along the first virtual line and in the direction along the second virtual line, said second beam converting means allowing the laser beam, having passed through said first beam converting means, to pass therethrough;

wherein said first beam converting means and said second beam converting means are arranged such that conjugate points correspond to each other in the direction along the first virtual line and in the direction along the second virtual line.

16. A beam reshaping device according to claim 15, wherein at least one of said first beam converting means and said second beam converting means comprises a toroidal lens.

17. A beam reshaping device according to claim 15, wherein at least one of said first beam converting means and said second beam converting means comprises a hologram element.

18. A beam reshaping device according to claim 15, wherein said first beam converting means and said second beam converting means comprise a light incoming plane and a light outgoing plane of a single lens, respectively, which planes are formed into toroidal planes.

19. An anamorphic optical system having an optical axis, a first axis perpendicular to the optical axis, and a second axis perpendicular to the optical axis and the first axis, said anamorphic optical system comprising:

a first beam converging unit having a beam converging power in the first axis that differs from the beam converging power in the second axis; and a second beam converging unit having a beam converging power in the first axis that differs from the beam converging power in the second axis, wherein said first and second beam converging units are arranged such that conjugate points correspond to each other in the first axis and in the second axis.

20. An anamorphic optical system according to claim 19, wherein at least one of said first beam converging unit and said second beam converging unit comprises a toroidal lens.

21. An anamorphic optical system according to claim 19, wherein at least one of said first beam converging unit and said second beam converging unit comprises a hologram element.

22. An anamorphic optical system according to claim 19, wherein said first beam converging unit and said second beam converging unit each comprise a light incoming plane and a light outgoing plane of a single lens, respectively, which planes are formed into toroidal planes.

23. A method of reshaping a sectional form of a laser beam, comprising:

transmitting the laser beam through first and second beam converting units, wherein said first and second beam converting units each have a beam converging power in a first axis that differs from the beam converging power in a second axis, and are arranged such that conjugate points correspond to each other in the first axis and in the second axis.

24. A method of reshaping a sectional form of a laser beam according to claim 23, wherein at least one of said first beam converging unit and said second beam converging unit comprises a toroidal lens.

25. A method of reshaping a sectional form of a laser beam according to claim 23, wherein at least one of said first beam converging unit and said second beam converging unit comprises a hologram element.

26. A method of reshaping a sectional form of a laser beam according to claim 23, wherein said first beam converging unit and said second beam converging unit each comprise a light incoming plane and a light outgoing plane of a single lens, respectively, which planes are formed into toroidal planes.

27. A method of correcting astigmatism in a laser beam, comprising:

transmitting the laser beam through first and second beam converting units, wherein said first and second beam converting units each have a beam converging power in a first axis that differs from the beam converging power in a second axis, and are arranged such that conjugate points correspond to each other in the first axis and in the second axis.

28. A method of correcting astigmatism in a laser beam according to claim 27, wherein at least one of said first beam converging unit and said second beam converging unit comprises a toroidal lens.

29. A method of correcting astigmatism in a laser beam according to claim 27, wherein at least one of said first beam converging unit and said second beam converging unit comprises a hologram element.

30. A method of correcting astigmatism in a laser beam according to claim 27, wherein said first beam converging unit and said second beam converging unit each comprise a light incoming plane and a light outgoing plane of a single lens, respectively, which planes are formed into toroidal planes.

* * * * *